Aug. 14, 1928.  
J. A. B. SMITH  
1,680,813  
COMBINED TYPEWRITING AND CARD PERFORATING MACHINE  
Filed April 20, 1926   9 Sheets-Sheet 1
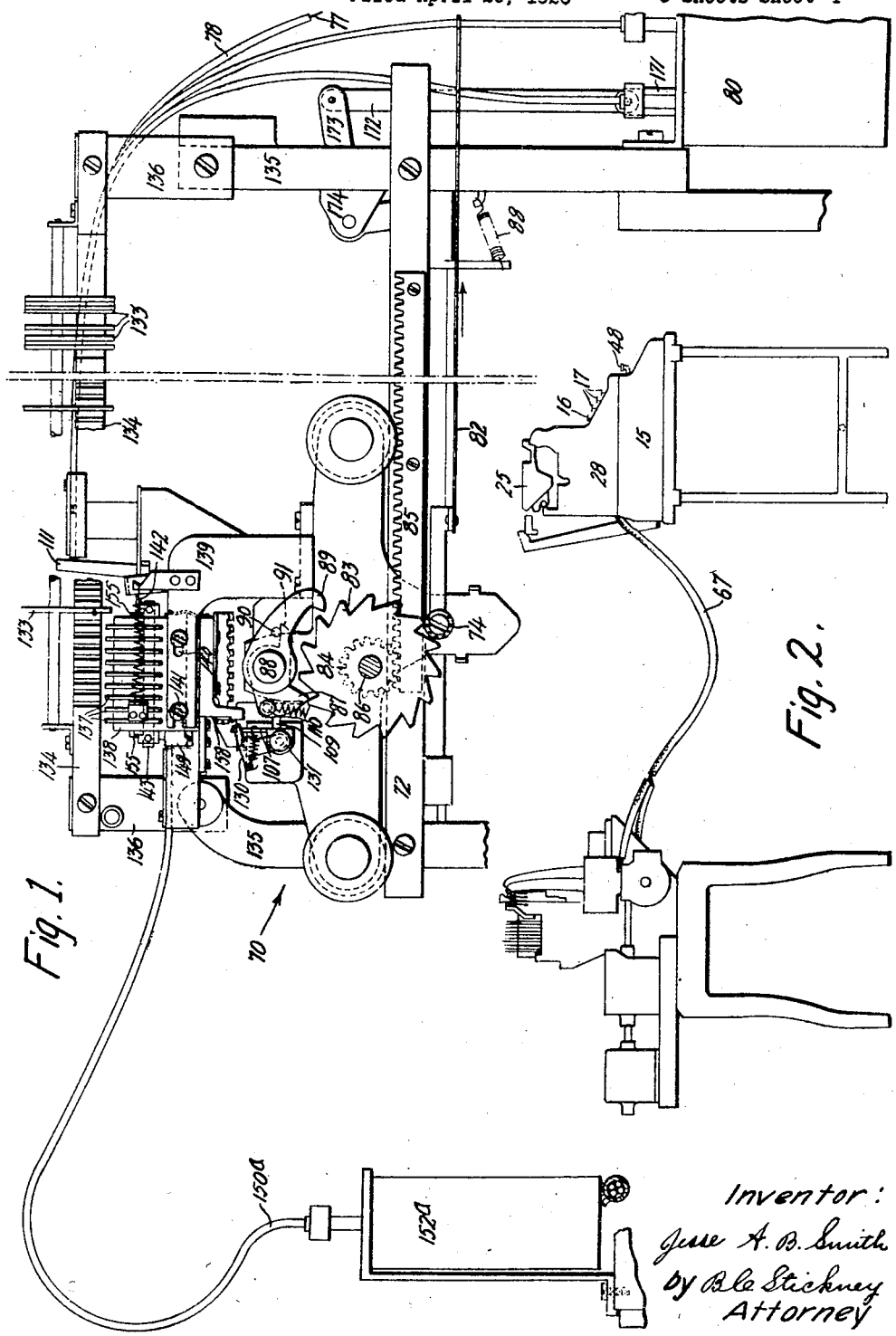
Inventor:  
Jesse A. B. Smith  
by B. L. Stickney  
Attorney Aug. 14, 1928.
J. A. B. SMITH
1,680,813
COMBINED TYPEWRITING AND CARD PERFORATING MACHINE
Filed April 20, 1926 9 Sheets-Sheet 2
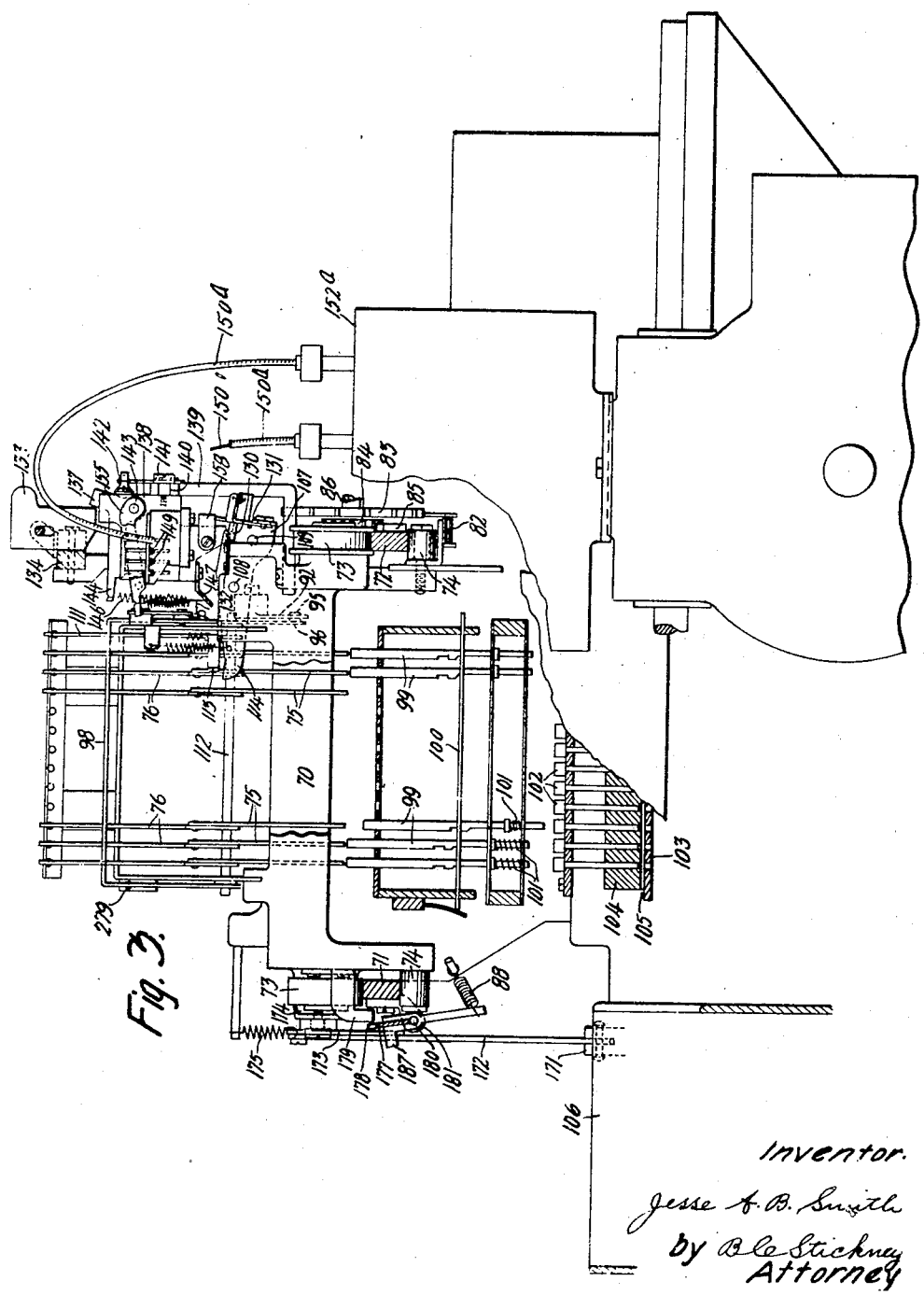
Inventor.
Jesse A. B. Smith
by B. Le Stickney
Attorney Aug. 14, 1928. 1,680,813
J. A. B. SMITH
COMBINED TYPEWRITING AND CARD PERFORATING MACHINE
Filed April 20, 1926   9 Sheets-Sheet 3
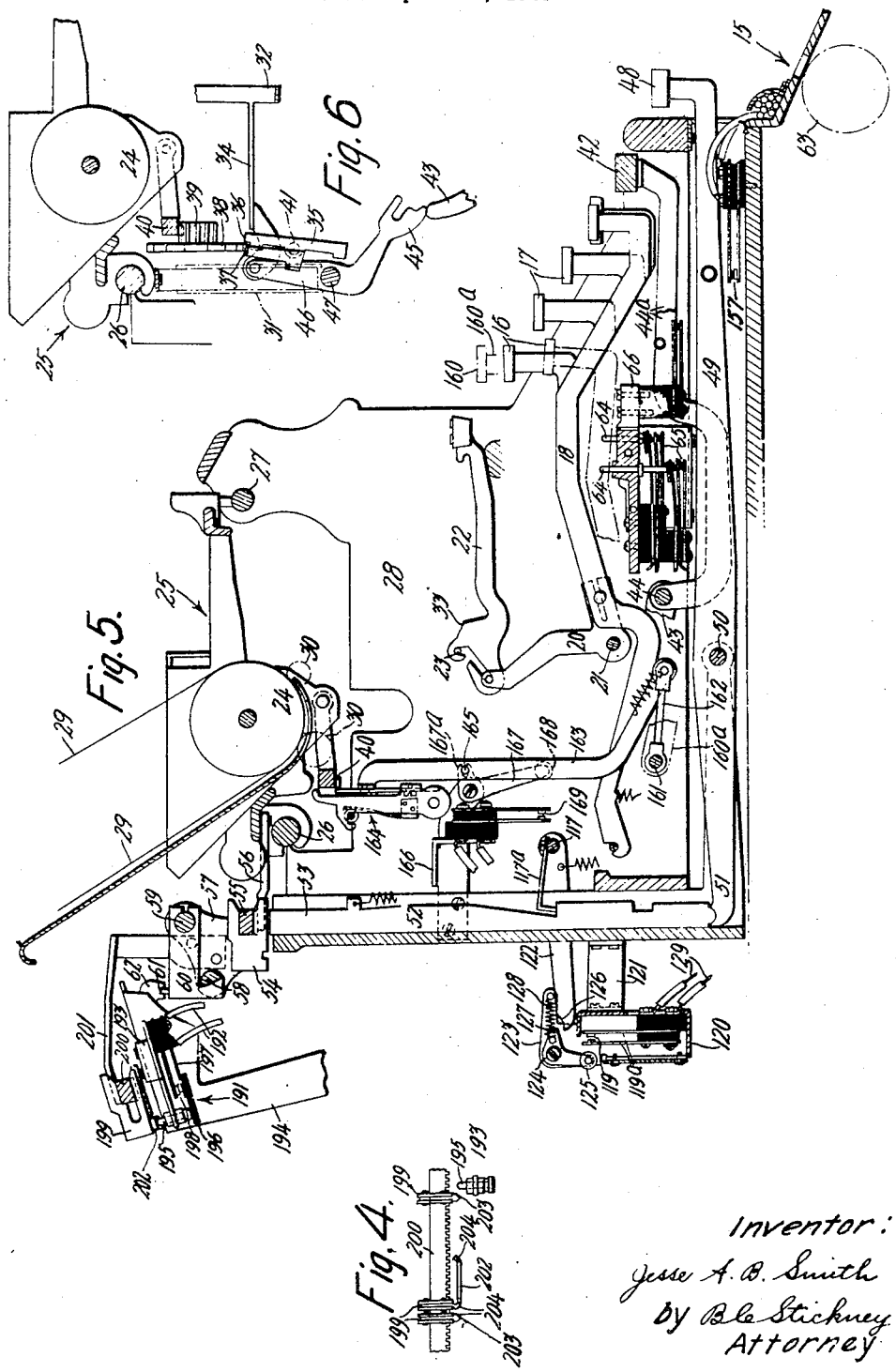
Inventor:
Jesse A. B. Smith
by B. L. Stickney
Attorney Aug. 14, 1928.
J. A. B. SMITH
1,680,813
COMBINED TYPEWRITING AND CARD PERFORATING MACHINE
Filed April 20, 1926
9 Sheets-Sheet 4
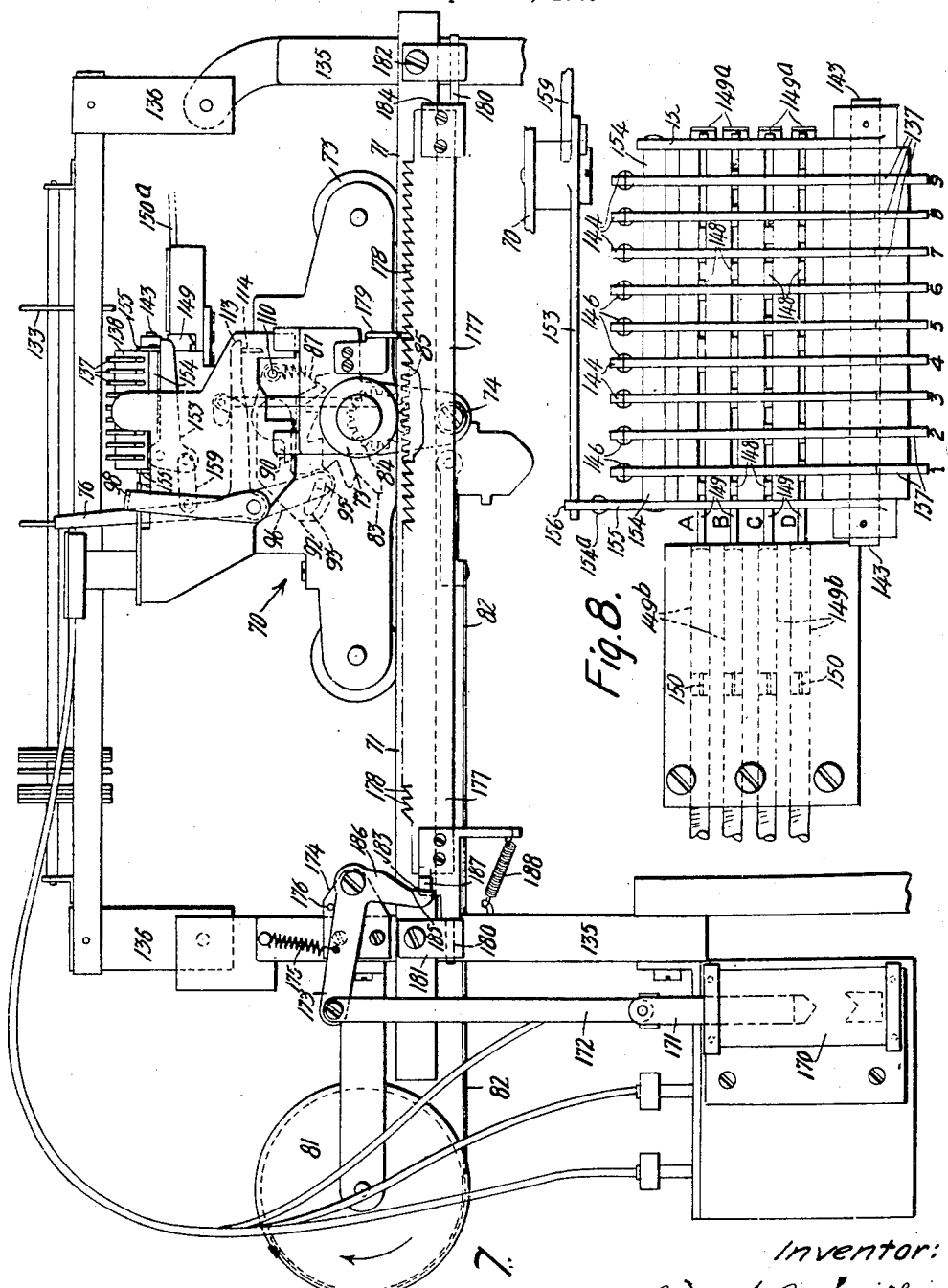
Inventor:
Jesse A. B. Smith
by B. Le Stickney
Attorney Aug. 14, 1928.

J. A. B. SMITH 1,680,813

COMBINED TYPEWRITING AND CARD PERFORATING MACHINE

Filed April 20, 1926   9 Sheets-Sheet 5

Inventor:
Jesse A. B. Smith
by B. C. Stickney
Attorney

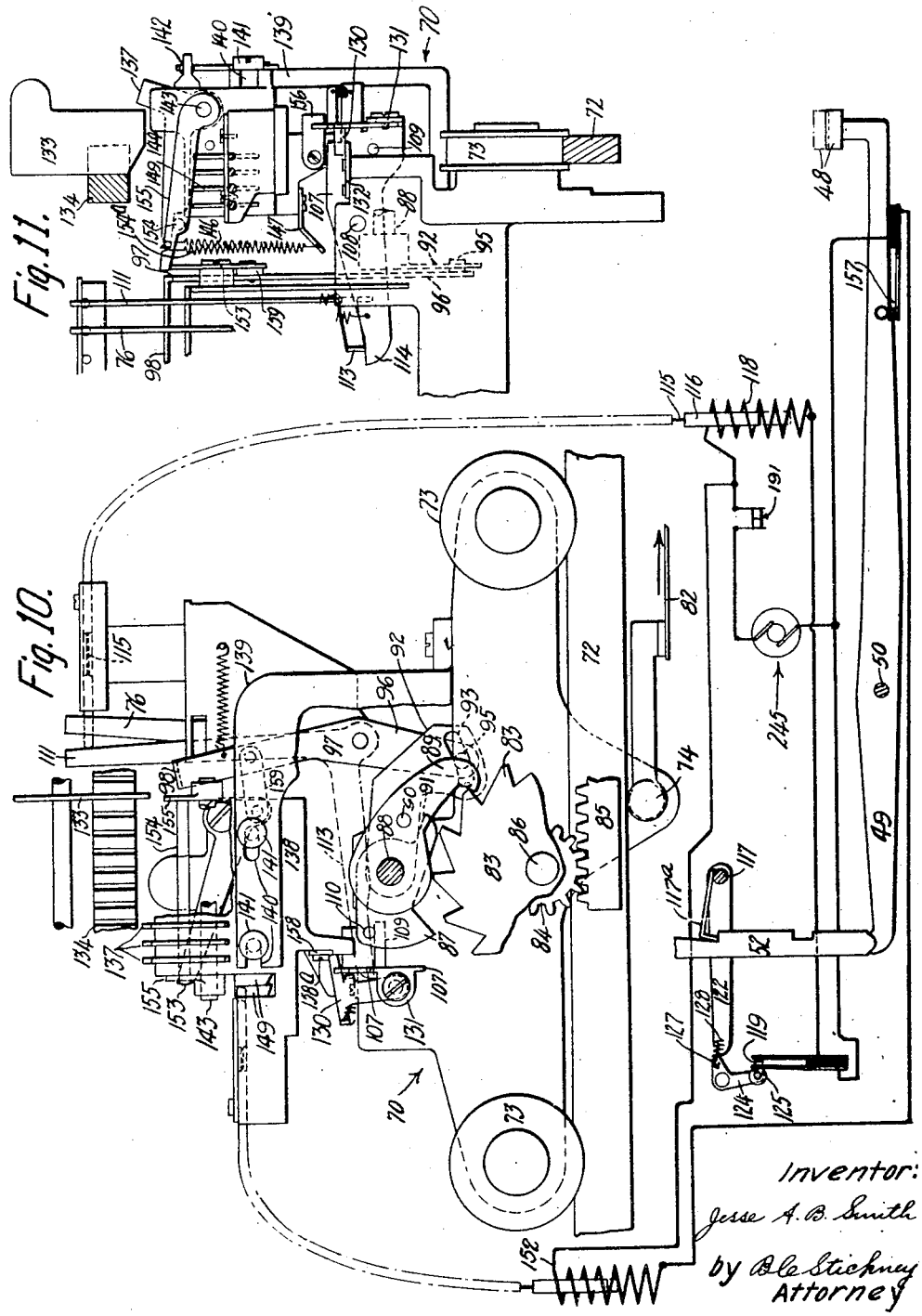

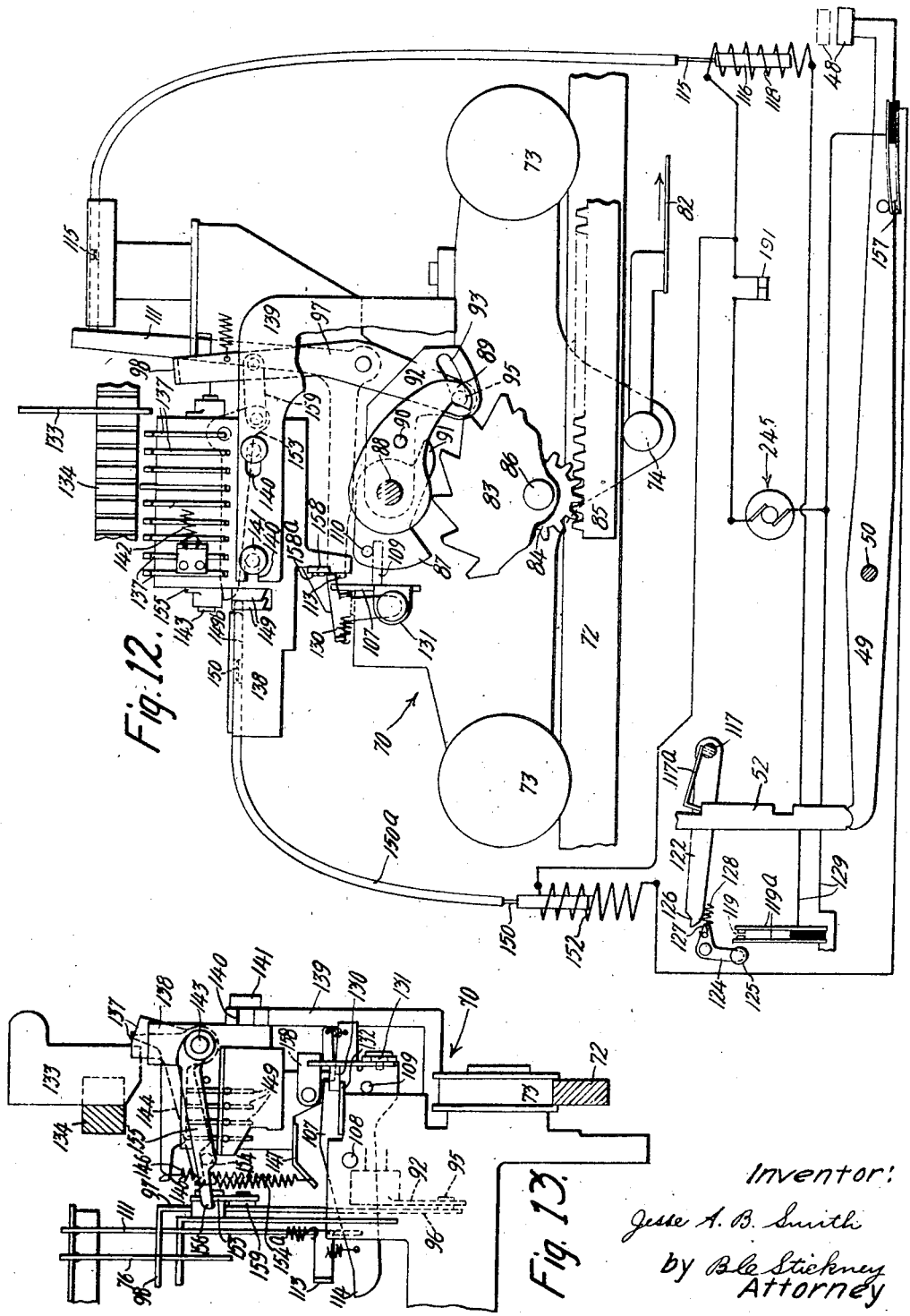

Aug. 14, 1928.

J. A. B. SMITH 1,680,813

COMBINED TYPEWRITING AND CARD PERFORATING MACHINE

Filed April 20, 1926     9 Sheets-Sheet 8

Inventor:
Jesse A. B. Smith
by B. C. Stickney
Attorney

Aug. 14, 1928.
J. A. B. SMITH
1,680,813
COMBINED TYPEWRITING AND CARD PERFORATING MACHINE
Filed April 20, 1926   9 Sheets-Sheet 9
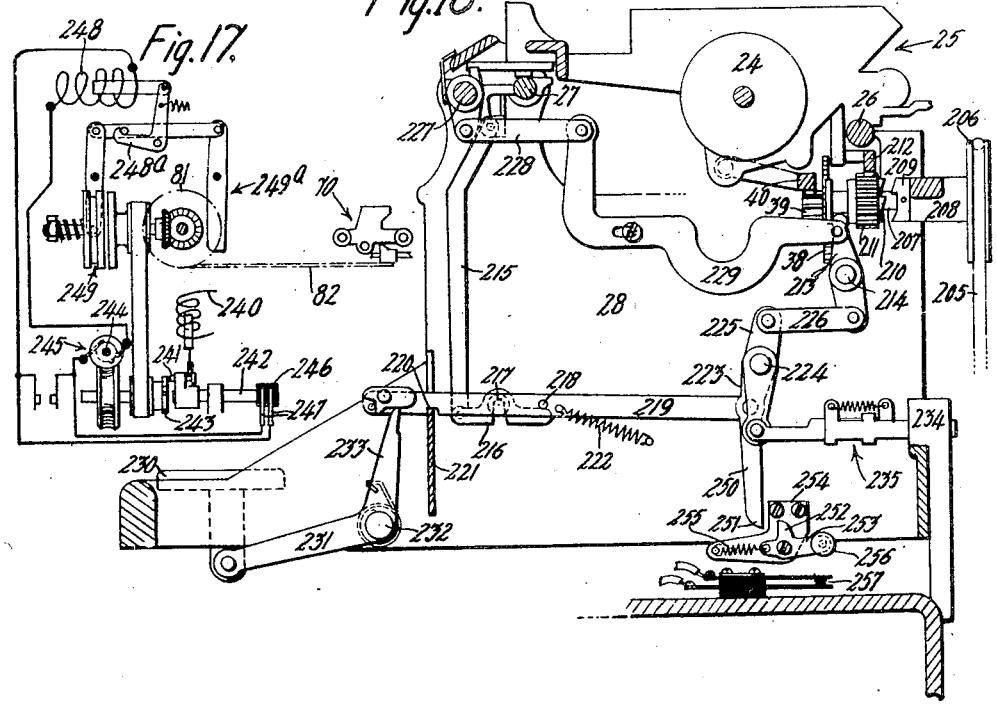
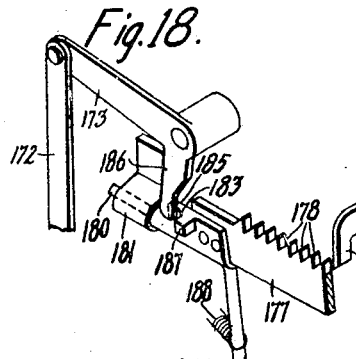
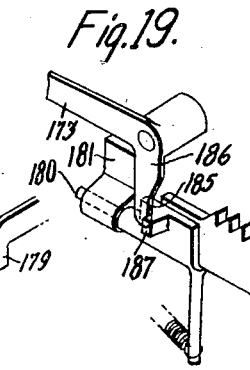
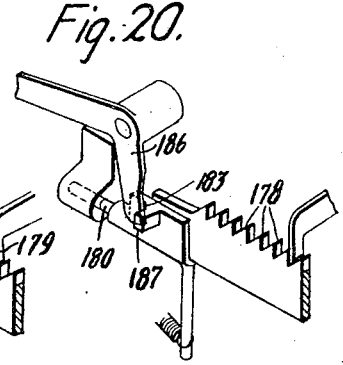
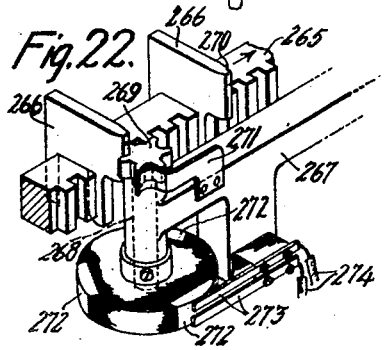
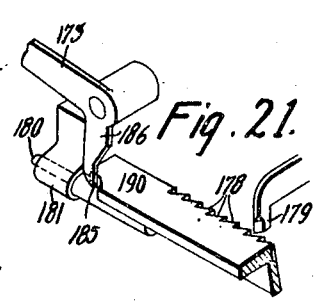
Inventor:
Jesse A. B. Smith
by B. C. Stickney
Attorney Patented Aug. 14, 1928.

1,680,813

UNITED STATES PATENT OFFICE.

JESSE A. B. SMITH, OF STAMFORD, CONNECTICUT, ASSIGNOR TO UNDERWOOD ELLIOTT FISHER COMPANY, OF NEW YORK, N. Y., A CORPORATION OF DELAWARE.

COMBINED TYPEWRITING AND CARD-PERFORATING MACHINE.

Application filed April 20, 1926. Serial No. 103,220. REISSUED

This invention relates to means for quickly positioning the carriage of a card-perforator or similar machine, and particularly relates to a mechanism for tabulating the carriage denominationally and a key-controlled backspacing mechanism usable for correcting a wrong denominational positioning of the carriage.

Means for denominationally positioning a card-perforator carriage are especially useful when the perforator by suitable coupling means is operated jointly with a typewriting machine in which denominational positioning of the typewriter-carriage is practiced for accounting work.

Such joint operation is for the purpose of producing perforated record-cards corresponding to data simultaneously typed on a work-sheet in the typewriter. As is well known, the record-cards are subsequently used in many ways for statistical analyses, reports, groupings, etc. A line of data written on the typewriter may include portions which need not be punched in the record-card, and while such portions are being typed the perforator must be inactive.

Heretofore suspension and resumption of joint operation were effected by pressing or releasing a foot pedal which opened or closed a coupling circuit by means of which the two machines were coupled for joint operation. By improper or inopportune use of this pedal mistakes are liable to occur. A further object of this invention, therefore, is the provision of means for automatically controlling suspension and resumption of joint operation of the two machines, and particularly to provide such controlling means as shall be readily settable or adjustable and adaptable to such machines in which the carriages are not mechanically coupled.

Another object of the present invention is the provision of means adaptable to such machines in which the carriages are not mechanically coupled, whereby the starting of the usual powder-driven means for return of the typewriter-carriage automatically causes a machine cycle of the card-perforator to be initiated. During such a cycle the card is punched according to the data written on the typewriter. Toward the end of the cycle after the punching is completed the perforator-carriage is also returned.

The automatic cycle-initiating means are so devised as to be operable irrespective of whether the typewriter-carriage-return movement is initiated automatically by the movement of the typewriter-carriage as it reaches the end of a line or manually by pressing the usual carriage-return-key. Manually controllable means are provided to make said automatic cycle-initiating means inoperative at will. Heretofore, in combined typewriting and perforating machines it was necessary to operate two keys at the end of every typewritten line. One key was operated to return the typewriter-carriage and another key was operated to initiate a machine cycle of the card-perforating machine. By the aforesaid means of the present invention, both functions may be accomplished by depressing only the carriage-return-key, or, if the carriage-return movement is automatically initiated at the end of a typewritten line, no key need be depressed.

The invention is herein illustrated as applied to a combined typewriting and card-perforating machine embodying the well-known Underwood-Hanson bookkeeping machine and the Powers key-punch. The Powers key-punch, hereinafter called the card-perforator, is substantially of the type shown in the patent to W. W. Lasker, No. 1,287,706, dated December 17, 1918. The Underwood-Hanson bookkeeping machine, hereinafter called the typewriter, is substantially of the type shown in the patent to Frederick A. Hart, No. 1,270,411, dated June 25, 1918, and is equipped with a denominational tabulating mechanism controlled by denominational tabulating keys.

Each machine has a carriage driven by its own spring-motor, and the carriages of the typewriter and card-perforator are, respectively, movable in letter-feeding and hole-spacing steps controlled by escapement mechanisms. The perforator-carriage escapement mechanism is actuated by the punch-selecting mechanism, of which the carriage forms a part. By means which include electromagnets and suitable contact devices in the circuits of the magnets, as shown in the pending application of Alfred G. F. Kurowski, Serial No. 48,723, filed August 7, 1925, the operation of the typewriter-keys to print also actuates the punch-selecting mechanism, so that punches for subsequently punching holes corresponding to the characters typed are selected. This selection is effected, as each key is struck, by depressing and locking a pin over the punch or punches corresponding to said key. The card at the proper time is raised and those punches which have not been selected rise with the card. The selected punches, held down by the locked pins, penetrate and punch the card by cooperating with a die-plate underneath the card, said die-plate having a hole for each punch.

The card is raised and presented against the punches by means of a frame which includes the die-plate. This frame is raised and lowered during a machine cycle of the perforator, which is initiated after the punches have been selected by operation of the typewriter-keys. Toward the end of this cycle the punched card is ejected from said frame and replaced by a blank card. In the operation of the punch-selecting mechanism, the perforator-carriage carrying a row of twelve pin-setting plungers actuated by the aforesaid electromagnets traverses the field of settable pins, of which there is, as stated, one over each punch. There are forty-five columns of twelve punches each in the perforator shown herein. The perforator-carriage moves in steps from column to column. At each step a punch or punches may be selected. It will be understood that operation of a typewriter-key may cause two punches to be selected if the corresponding character is designated by two holes in the same column of the card.

Since the punches are caused to be selected by operation of the typewriter-keys, it follows that the perforator-carriage travels step by step in unison with the typewriter-carriage, on account of the simultaneous actuation of their respective escapement mechanisms.

Heretofore, in combined typewriting and card-perforating machines in which the respective carriages are not mechanically coupled, no means have been provided for effecting denominational tabulation of the perforator-carriage corelatively with denominational tabulation of the typewriter-carriage. Such means are provided in the present invention, which, in its preferred form, uses the mechanism usually provided in the illustrated card-perforator for effecting so-called column tabulation. Said means, as a supplement to this mechanism, consist of novel devices by means of which denominational tabulating may be effected.

By providing denominational tabulating mechanism for the perforator-carriage, as well as for the typewriter-carriage, it is possible to tabulate both carriages to the same denomination in corresponding zones. It is also feasible, inasmuch as each of the carriages moves by and under the control of its own spring-motor and escapement-mechanism, that the carriages may be corelatively positioned or tabulated in corresponding zones of dissentaneous extents. For example, a card-zone for which the perforator-carriage is tabulated may include only four denominational columns, while the corresponding typewriter-work-sheet-zone may have say eight columns, the number of typewriter-zone-columns usually exceeding the number of columns in the corresponding card-zone in order to provide for footing up a total of all the items in the typewriter-zone. Furthermore, the corresponding zones on the typewriter-work-sheet and the card may be in dissentaneous locations. For example, two zones on the work-sheet for which there are corresponding zones on the card may be separated by one or more intermediate zones for which there are no corresponding zones on the card. While the typewriter is being operated for the intermediate zones, the perforator-carriage may be caused to remain idle and stationary by means hereinafter explained. Then, when the work-sheet-zone for which there is a corresponding zone on the card is reached, operation of the denominational tabulating mechanisms will cause their respective carriages to be tabulated denominationally and, it may be, to dissentaneous extents. It may therefore be also said that, by reason of the aforesaid intermediate work-sheet-zones, the zones to which both carriages are now tabulated are in dissentaneous locations, the locations being dissentaneous in respect to the number of zones through which each carriage has moved.

The usual column-tabulating mechanism of the card-perforator includes a key-controlled electromagnet, which, through the usual means, operates and sets a lever to release the carriage from the control of its escapement mechanism. The escapement mechanism, including an escapement-wheel and pallets, is mounted with said lever on the perforator-carriage. In effecting this release, the operation and setting of the lever disengage the holding pallet from the escapement-wheel. A latch on the end of the lever is caught and held by suitable means when the lever is set, thereby sustaining the lever in its set position. In the ensuing tabulating movement of the perforator-carriage, the latch, moving with the carriage, encounters a stationary but settable counter-stop and is tripped thereby. The holding pallet thereupon re-engages the escapement-wheel, thereby arresting the carriage and stopping the tabulating movement thereof.

To denominationally position the carriage in the column predetermined by the position of the counter-stop, a series of denominational stops, one for every denominational tabulating key on the typewriter, is provided. The denominational stops are selectively movable for interception by the counter-stops, and are supported in a structure on the perforator-carriage. Said structure is mounted so that it moves longitudinally and relatively of said carriage when a denominational stop is intercepted by a counter-stop. A tappet on said structure, as it thus moves, strikes and trips the aforesaid latch.

The counter-stop, which is usually one of a plurality of such stops, is settable along the usual stationary member which, however, is shifted from its regular position in order that the tappet presenting structure supporting the denominational stops may be interposed between said counter-stops and the aforesaid latch.

Means controlled by keys, which, in the illustrated form of the invention, are the denominational tabulating keys of the typewriter, are provided to select and move a denominational stop corresponding to the operated key. Suitable circuit-closing devices underlying the tabulating keys are provided and are actuable by said keys to close electric circuits, by means of which electromagnets are energized to operate the denominational stop-selecting means. The operation of any tabulating key also actuates a supplementary circuit-closing device, which is connected to the usual universal bar operated by the typewriter denominational stops, and is therefore common to all keys. This supplementary circuit-closing device, for reasons to be explained later, is, by suitable means, closed during the first and greater part of the tabulating key-stroke, but is open at the end of said stroke. Upon operation of any tabulating key said supplementary device closes a circuit to energize the electromagnet which releases the perforator-carriage for a tabulating movement, which, as stated, is terminated by means of the denominational stop selected by operation of said key.

An electromagnet may be provided for each stop to actuate means to select said stop. Like the electromagnets for the pin-setting plungers, these electromagnets are solenoids having movable cores or plungers. Included in the operating connections from said plungers are flexible push-wires. These push-wires are encased in flexible sheaths, and their number, if one is provided for each denominational stop, added to the number of pin-setting push-wires, forms an aggregate that tends to impede the free movement of the perforator. The magnets do not move with the carriage but are stationary relatively thereto.

In the preferred form of the present invention, means for selecting a denominational stop are provided whereby the number of operating magnets and related push-wires is substantially less than the number of denominational stops. The typewriter herein illustrated has nine tabulating keys, and nine corresponding denominational stops are provided on the card-perforator-carriage. These stops are in the form of tabs upstanding from arms suitably spaced in parallel array and pivotally supported in the previously-mentioned structure, so that the edges of the arms of said stops overlie a number of stop-selectors also supported in said structure and slidable transversely of and under said edges. A spring on the end of each arm urges rotation of the stops about a common fulcrum shaft, so that the stops tend to move into a position for interception by a counter-stop.

The stop-selectors have formations which normally oppose and prevent such rotation. These formations on each selector are so coordinated to the formations on the other selectors as to leave an opening for the arm of a denominational stop, which may then rotate only if a corresponding arrangement of the relative positions of the selectors is effected. To effect this arrangement the selectors are relatively moved.

The number of stop-selectors required depends on the number of denominational stops and the number of magnets that may be energized when a tabulating key is operated. It will be understood that operation of an inordinate number of magnets by one tabulating key is objectionable on account of the multiplicity of contacts required. It is preferable to operate not more than two magnets by one key.

A group of four stop-selectors is arrangeable, according to the well-known formula for combinations, in ten different combinations of their relative positions, not counting their normal positions, if for each arrangement one or two selectors are shifted from normal. Thus only four solenoids, one for each stop-selector, need be provided to effect the selection of any one of ten denominational stops. A group of five selectors affords fifteen different combinations if no more than two selectors are shifted. Each selector is caused to be moved, by energizing a corresponding solenoid, to the plunger of which it is connected by means of one of the aforesaid push-wires.

The arms of the denominational stops being spring-pressed and normally bearing on the opposing formations of the stop-selectors, means are provided to hold said arms clear of the stop-selectors while they are being shifted. Said arm-holding means are operatively connected to the usual universal member on the perforator-carriage and actuable either by the typewriter-key-controlled punch-selecting means or by the means that release the perforator-carriage for a tabulating movement. Said carriage-releasing means are operated by a magnet, which, as already explained, is energized during only a part of the tabulating key-stroke. At the end of said stroke, the arm-holding means have reassumed their normal positions, allowing the arm of the selected denominational stop to fall into the opening presented by the stop-selectors that were caused to be shifted during said stroke. The arm of the selected stop remains in this opening until either a printing key or another tabulating key is operated. Operation of a printing key causes the arms of all the denominational stops to be held clear of the stop-selectors, which, being spring-pressed, reassume their normal positions.

Means for back-spacing the perforator-carriage include a longitudinal member having teeth or notches spaced according to the steps of the perforator-carriage. Said longitudinal member is mounted so that it may first be moved to engage one of its tooth or notch formations with a suitable projection on the perforator-carriage, and then further moved to effect a back-spacing step of the perforator-carriage. The back-spacing movement of the longitudinal member is limited by a stop, which, in conjunction with proper formation of the teeth or notches on said member, substantially prevents overthrow of the perforator-carriage in back-spacing.

To impart the aforesaid movements to the longitudinal member, means operated by an electromagnet are provided. This electromagnet by means of a suitable circuit-closing device is caused to be energized by operation of the usual back-space key of the typewriter. Full depression of said back-space key causes a slight excess of movement in the resulting back-spacing step of the typewriter-carriage, and it is that part of the back-space key-stroke, incidental to said excess movement, during which the circuit-closing device for the perforator-carriage back-spacing solenoid is operated. Thus the typewriter-carriage has completed its back-spacing step before a back-spacing movement is imparted to the perforator-carriage. This is a necessary condition if means controlled by the position and movements of the typewriter-carriage are used to automatically suspend and resume joint operation of the two machines.

In the present invention the coupling means between the typewriter and the card-perforator include a main coupling circuit. For suspending and resuming joint operation between the typewriter and card-perforator, a circuit-opening device normally closed is provided and placed near the typewriter-carriage, and is connected in the main coupling circuit. To cause said device to be open while the typewriter-carriage is passing through predetermined zones in which joint operation is suspended, there is provided on the typewriter-carriage a member having notches into which different "stops" may be set in the same manner as tabulating stops are set. These stops have edges or surfaces which, as the typewriter-carriage moves into and through said zones, open and hold open the circuit-opening device. The extent of said surfaces which hold the circuit-opening device open depends on the extent of the zone in which joint operation is suspended. One of said surfaces becomes an edge if suspension and resumption of joint operation occur in two consecutive steps of the typewriter-carriage.

Included in the coupling circuit is the solenoid that operates the back-spacing means for the perforator-carriage. When the main coupling circuit is broken during suspension of joint operation, the perforator-carriage will not be back-spaced when the typewriter-carriage is back-spaced. At the end of the step in which the typewriter-carriage passes from a zone in which joint operation was suspended, the main coupling circuit is again closed. If at this stage it is necessary to back-space the typewriter-carriage, the main circuit must be broken before the back-spacing solenoid is energized, or else both carriages will be back-spaced. Therefore, as explained, the typewriter-carriage is back-spaced and the main circuit is broken before the completion of the back-space key-stroke, and, since it is during the completion of said stroke that the back-space solenoid is ordinarily energized, the perforator-carriage at said stage of the typewriter-carriage will not be back-spaced.

The typewriter and card-perforator may be used under circumstances requiring a frequent change of the setting of the aforesaid stops, whereby joint operation is suspended, and a large variety in the kind of work done may require a large assortment of stops, owing to the different lengths of actuating surfaces required. There is therefore also shown herein means whereby uniform stops may be used. Such uniform stops are also settable on the typewriter-carriage, and, when said carriage moves into and out of a zone of suspended joint operation, are effective to rotate a pinion provided for this purpose. A commutator switch spanning a pair of brush-like contacts bearing thereon is connected to and actuated by said pinion. Said pinion has a limited number of teeth, so that a stop may, in one letter-feeding step of the typewriter-carriage, engage and rotate said pinion and escape therefrom. The segments of the commutator are arranged to alternately open and close the circuit in which the contacts are connected in successive steps of the pinion. Thus a stop, formed to act as a tappet to rotate said pinion, may be set at the beginning and another stop at the end of a zone of suspended joint operation, and these stops will, respectively, open and close said circuit to cause suspension and resumption of said joint operation at the beginning and end of said zone, the stops being set apart a distance corresponding to the extent of said zone. It will be understood that other suitable means to suspend and resume joint operation may be used in connection with a pair of uniform stops for each of said zones, the invention, as related to this feature, residing mainly in the use of uniform stops, irrespective of the particular means actuated thereby.

Other features and advantages will hereinafter appear.

In the accompanying drawings,

Figure 1 is a front elevation of the card-perforator carriage showing features of the denominational tabulating mechanism, and showing some features of the back-spacing mechanism.

Figure 2 shows a card-perforator coupled to an Underwood bookkeeping machine for joint operation.

Figure 3 is a partially sectioned side view of the card-perforator carriage showing the denominational tabulating and back-spacing mechanisms.

Figure 4 is a detail view of the settable stops by means of which joint operation is suspended.

Figure 5 is a sectional side elevation of an Underwood typewriter as used in this invention.

Figure 6 is a side elevation of the typewriter-escapement mechanism.

Figure 7 is a rear view of the perforator-carriage, and shows features of the back-spacing mechanism for said carriage.

Figure 8 is a top plan view of the card-perforator denominational stops, their selector-bars and some of the related parts.

Figure 10 is a front elevation of the perforator-carriage, and shows the relation of parts of the denominational tabulating mechanism at a time when a tabulating key is partly depressed.

Figure 11 is a side view of some of the parts as shown in Figure 10.

Figure 12 is a front elevation of the perforator-carriage, and shows the relation of parts of the tabulating mechanism at a time when a tabulating key is fully depressed.

Figure 13 is a side view of some of the parts as shown in Figure 12.

Figure 16 is a side view of the typewriter showing the carriage-return initiating means and the means for initiating a machine cycle of the card-perforator.

Figure 17 is a diagrammatic view showing the perforator cycle initiating and driving means.

Figure 18 shows the normal position of the card perforator back-spacing bar and related parts.

Figure 19 shows the card-perforator back-spacing bar engaged and latched to impart a back-spacing movement to the perforator-carriage.

Figure 20 shows the relation of the back-spacing bar and its associated parts at the end of a back-spacing slide.

Figure 21 is an alternative construction of the back-spacing bar.

Figure 22 shows means whereby joint operation may be automatically suspended and resumed by the use of uniform stops.

Figure 9:
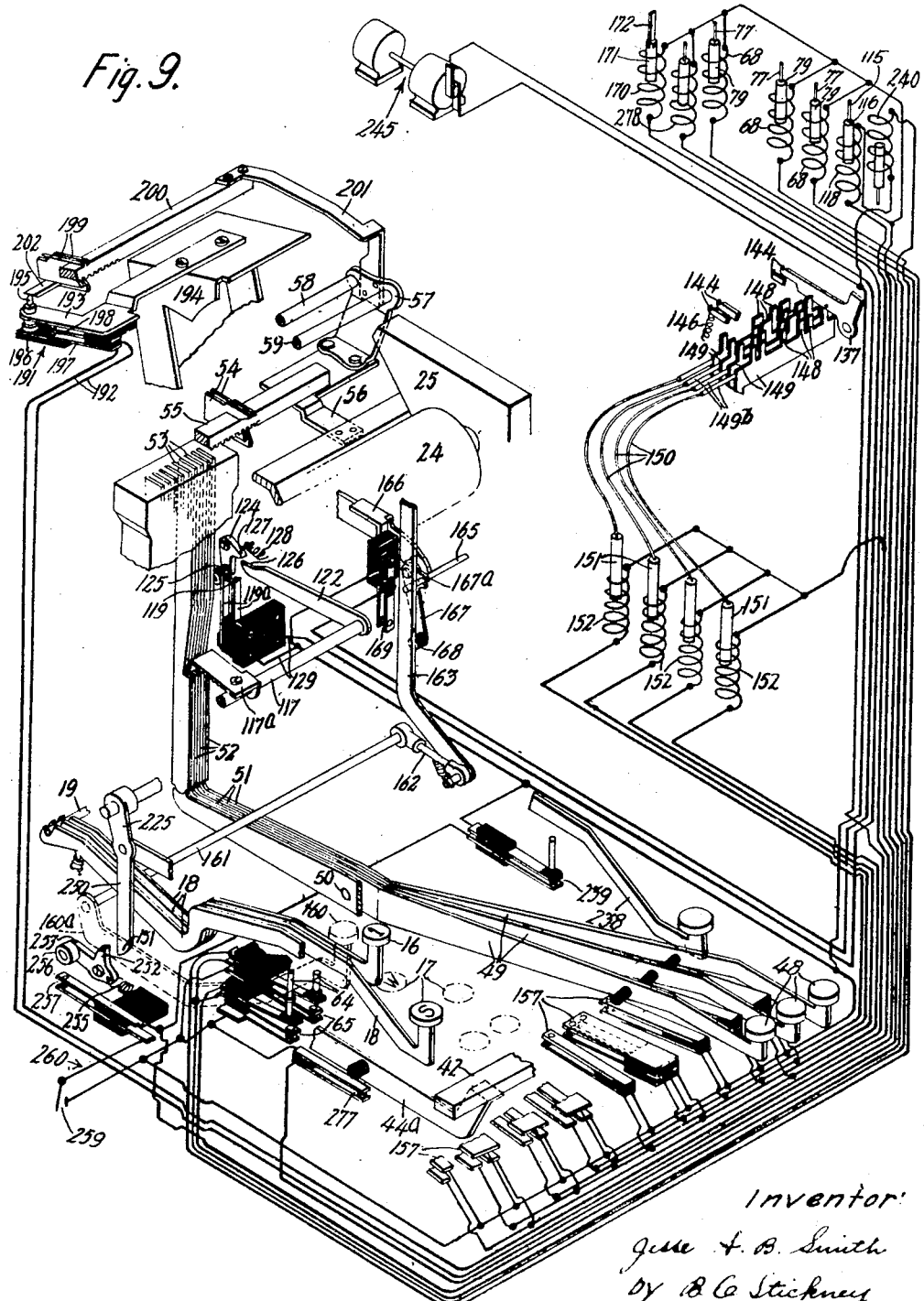
Figure 9 is a diagram showing in perspective the electrical and other devices of the invention.
Figure 14:
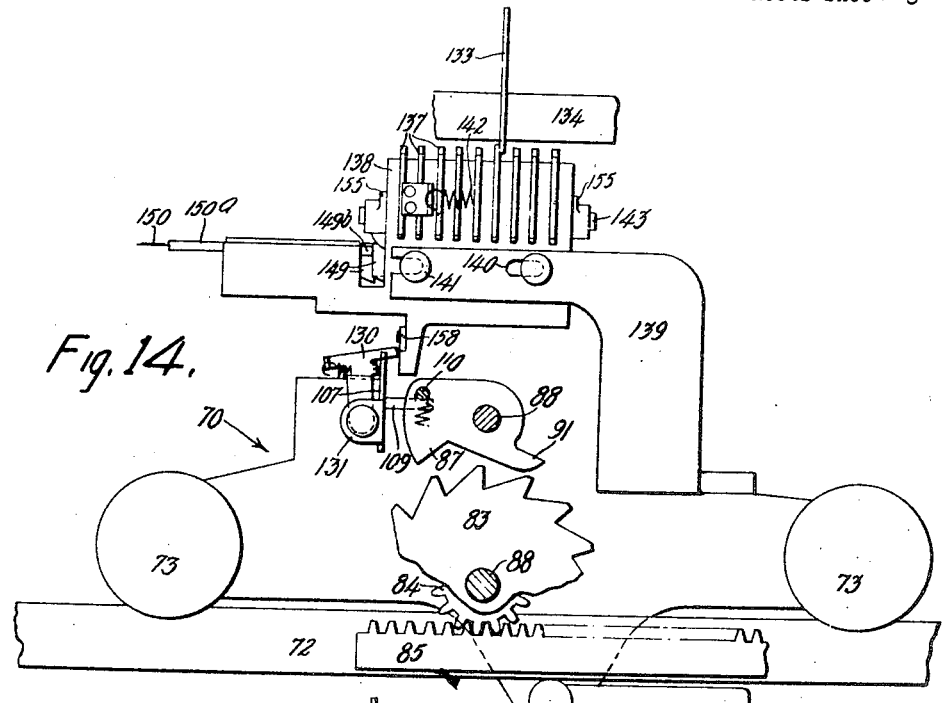
Figure 14 is a front view of the perforator-carriage showing the relation of parts of the escapement mechanism when a denominational stop has just been intercepted by a counter-stop.
Figure 15:
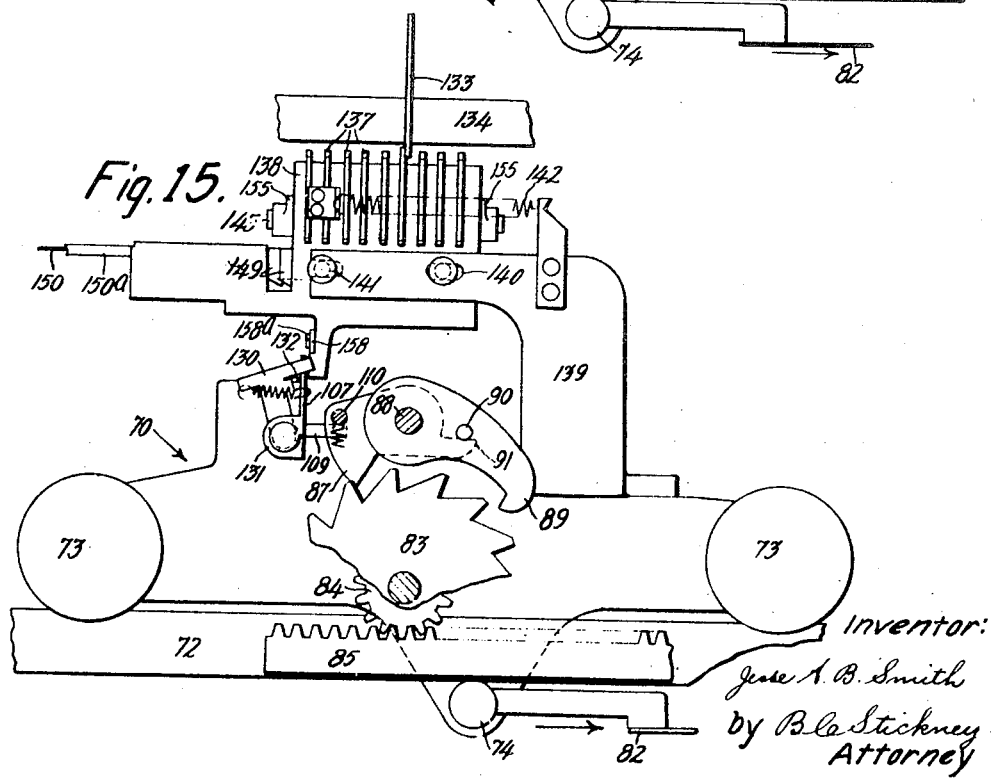
Figure 15 is a front view of the perforator-carriage, showing the relation of the parts of the escapement mechanism caused by a continued movement of the perforator-carriage after a denominational stop has been intercepted by a counter-stop.

The Underwood-Hanson bookkeeping machine (Figure 5) includes the well-known Underwood typewriter mounted upon an adding mechanism 15. Depression of numeral keys 16 and alphabet keys 17, swings key-levers 18 about a fulcrum 19 to swing bell-cranks 20 about a fulcrum 21. Said bell-cranks swing type-bars 22 about a fulcrum 23 to print against a platen 24. The platen is mounted in a carriage 25 which moves to and fro upon rails 26 and 27 supported in a typewriter-frame 28. A worksheet 29 may be fed around the platen by the usual feed-rolls 30.

In its advance movement the carriage 25 is pulled by a spring motor 31 and moves in letter-feeding steps controlled by an escapement mechanism actuated by a universal bar 32, Figure 6, which in turn is actuated by the heel 33 of any operated type-bar. A rearward extension 34 of the universal bar engages a dog-rocker 35, which has a fixed dog 36 and a loose dog 37 controlling an escapement wheel 38 that is connected in the usual way to a pinion 39, meshing with a letter-feeding rack 40. Operation of any type-key causes the dog-rocker to vibrate about a fulcrum 41, and in this manner actuates the escapement mechanism. Operation of a space-bar 42 similarly actuates the escapement mechanism by means of an arm 43, fastened to the space-bar rock-shaft 44 actuated by the space-bar levers 44ᵃ. Said arm 43 engages an arm 45 fastened to the cross-piece 47 connecting levers 46, which support and are actuated by the rearward extension of the universal bar. Said arm 43, in this manner, actuates the dog-rocker. The cross-piece 47 is pivoted at its ends.

The usual Underwood denominational tabulating mechanism includes a plurality of denominational tabulating keys 48 on key-levers 49, pivoted on a common fulcrum rod 50. When a tabulating key is depressed, the rear arm 51 of the corresponding key-lever is raised and a denominational stop 52 is thereby elevated, so that its upper end 53 lies in the path of tabulating counter-stops 54. Said counter-stops are settable in a bar 55 mounted between brackets 56 projecting from the typewriter-carriage 25. In a typewriter combined with a computing mechanism the brackets 56 have upwardly-extending sides 57 spanned by rods 58 and 59. Settable along said rods and supported thereon is a computing selector-dog 60 having a tappet 61, which, as the typewriter-carriage moves along, may engage denominational jacks 62, which are part of the Underwood-Hanson computing mechanism, more fully described in the aforesaid patent to Hart. Said jacks 62 are successively operated by said tappet as the typewriter-carriage moves step by step through a computing zone. The selector-dog 60 is located and set on said rods 58 and 59 to operate said jacks in said computing zone. The denominational jack when operated causes a pin-bar, not shown, to be positioned so that it may be indexed according to the numeral-key depressed. Said pin-bar subsequently registers the amount indexed therein in a computing wheel 63, by means fully described in said patent. Underlying the key-levers 18 and operable thereby, by means of plungers 64, is a plurality of contact devices 65 supported on a plate 66, supported in the typewriter-frame 28.

Leading from said contact devices are wires, which, with wires from other contact devices to be described, are gathered in a cable 67, which extends toward the card-perforator to form coupling circuits between said card-perforator and the typewriter. Included in said circuits are electromagnets in the form of solenoids 68 (see Figure 9), which, when energized, operate the punch-selecting mechanism of the card-perforator. Thus, whenever a typewriter-key is operated, a corresponding contact device 65 is closed and one or more solenoids are energized.

The punch-selecting mechanism of the perforator includes a carriage 70 movable in hole-spacing steps upon guide-rails 71 and 72. The carriage is guided upon said rails by means of upper rollers 73 and lower rollers 74. Operation of any typewriter-key causes one or two of twelve plungers 75, carried by said carriage, to be depressed by means of bell-cranks 76 operated by push-wires 77 encased in flexible sheaths 78, said push-wires being connected to the movable cores or plungers 79 of the solenoids (see Figure 9) contained within a case 80. The perforator-carriage is pulled in a hole-spacing direction by a spring-motor 81 connected to the perforator-carriage by a strap 82. An escapement mechanism controls the movements of the perforator-carriage in its hole-spacing steps, and consists of an escapement-wheel 83 which, as the perforator-carriage moves, is caused to rotate by a pinion 84 to which it is connected, said pinion rolling along a stationary rack 85. The escapement-wheel and its pinion are mounted on the perforator-carriage at 86. The escapement-wheel 83 has teeth of a pitch suitable to space the perforator-carriage in steps of hole-spacing extent. A holding pallet 87 normally holds the carriage stationary against the pull of its spring motor. Said pallet is loosely mounted on a shaft 88 adjacent a stepping pallet 89 separate from the holding pallet 87, but capable of moving the holding pallet by means of a pin 90 which engages an extension 91 of the holding pallet. The stepping pallet 89 is fastened to one end of the shaft 88. Said shaft has its bearing in the perforator-carriage, and upon the other end thereof is fastened a lever 92 having a cam slot 93. A pin 95 on the end of an arm 96, which extends from one side 97 of a bail member which includes a universal bar 98, vibrates said lever 92 when said universal bar is actuated. Said universal bar, lying against the bell-cranks 76, is moved whenever one of the plungers 75 is operated to select a punch, and consequently actuates the escapement mechanism to hole-space the carriage 70 every time a punch selection is made by operation of a typewriter-key. Selection of the punches is effected by means of pins 99. Wherever a punch is to be selected, one of said pins 99 is depressed by its corresponding plunger 75 and held in its depressed position by a latch-bar 100 against the reaction of a spring 101, which restores the pin to its normal position when the latch-bar is released or when another pin related to said latch-bar is depressed. There is a latch-bar for each column of twelve pins. The pin 99 when depressed opposes the upward movement of its corresponding punch, said punch being one of a plurality of punches 102 supported in an upwardly-movable frame which includes a die-plate 103 and another plate 104 that guides the lower ends of the punches. The die-plate 103 and the plate 104 are separated by a gap 105, which receives the card to be perforated. The perforating is effected by moving said frame upward. Those punches over which a pin was not depressed and latched move upwardly with the frame and its card, while those punches opposed by the ends of depressed pins penetrate and perforate the card. This perforation is done in a machine-cycle of the perforator subsequently to the selection of the punches effected by operation of the typewriter-keys in the manner described. After perforation, the card is ejected by means of rollers, not shown, and deposited in a receptacle 106, while a new card is being simultaneously fed also by means of rollers into place under the punches.

Regular column tabulation on the card-perforator herein shown is done by releasing its carriage from the control of its escapement mechanism for a tabulating movement and terminating said tabulating movement by terminating said release. This is accomplished by the usual means, which include a lever 107 pivoted at 108 upon the perforator-carriage. Said lever has a pin 109 which projects toward and underlies a pin 110 in the holding pallet 87. The lever 107 is rotated about its pivot by a bell-crank 111 similar to the bell-cranks 76 and mounted on the same shaft 112 upon which said bell-cranks 76 are mounted. The bell-crank 111 has an extension 113 which overlies an arm 114 on the lever 107. The bell-crank 111 is actuated by means of a push-wire 115 connected to a plunger 116 of a solenoid 118, which, in the regular card-perforator, is energized by closing contacts underlying the usual tabulating key of the perforator.

In the present invention these contacts are replaced by other contacts 119. Said contacts 119 are mounted in a suitable case 120 supported by means of a bracket 121 from the rear of the typewriter (see Figure 5). These contacts are required to be closed whenever any one of the typewriter denominational tabulating keys 48 is operated, and there is mounted on a shaft 117, which carries the usual universal bar 117ª that is actuated by the typewriter denominational stops 52, an arm 122 extending rearwardly toward the case 120. Said case has formed upon one side an upwardly-extending portion 123, upon which is pivoted a bell-crank 124, which, when rotated, will, by means of a roller 125 made of insulating material, close the contacts 119. Said contacts are normally open and mounted upon the usual resilient strips 119ª. This rotation is effected by the arm 122 as it moves upwardly whenever a tabulating key is depressed. In its upward movement the end 126 of said arm, after the contacts 119 have been closed, overrides and passes the tip 127 of the bell-crank lever, which thereupon resumes its normal position under the influence of a spring 128 allowing the contacts to separate again (see Figure 13). Thus the contacts 119 are closed during only a part of the tabulating key-stroke, and for reasons which will be presently described. In the return swing of the arm 122 the bell-crank 124 is swung in an opposite direction as the end 126 of the arm again but contrariwise overrides and passes the tip 127 of the bell-crank.

In this manner operation of any tabulating key closes for a moment the contacts 119 to close a circuit to energize the solenoid 118, causing the bell-crank 111 to operate the lever 107, and consequently releasing the escapement-wheel 83 from the holding pallet 87. The wires 129 connect said contacts in said circuit. The lever 107 is sustained in position to hold said holding pallet out of engagement with the escapement-wheel by means of a latch 130 pivoted on a tab 131 of the lever 107, said latch being caught upon a plate 132 and held thereby until the end of the tabulating movement. The universal bar 98 is also actuated by the bell-crank 111, so that when said bell-crank is operated the stepping pallet 89 engages the escapement-wheel and delays the start of the tabulating movement of the carriage until the bell-crank reassumes its normal position, which occurs when the contacts 119 are opened after the end 126 of the arm 122 has passed the tip 127 of the bell-crank 124.

In the regular card-perforator the tabulating movement of the carriage is terminated when a counter-stop 133 intercepts and trips the latch 130, thereby causing the lever 107 to reassume its normal position and the holding pallet 87 to re-engage the escapement-wheel 83. Supplementing the counter-stops 133, the present invention provides denominational stops by means of which the perforator-carriage is denominationally positioned in any column predetermined by one of the counter-stops 133. Said counter-stops, the same as those heretofore provided, are mounted on the usual notched bar 134 having notches spaced in hole-spacing steps. Said bar is mounted upon the frame 135 of the perforator. The bar 134 in the present invention has been, by means of extensions 136 (Figure 8), moved upwardly, so that there may be interposed between the counter-stops 133 and the latch 130 the denominational stop devices. Said devices include a plurality of denominational stops 137 spaced in a structure 138 which is mounted upon a bracket 139 supported by the perforator-carriage. The structure 138 is slidable on said bracket by means of slots 140, through which pass shoulder screws 141 fastened into and supporting the structure 138. A spring 142 normally keeps the structure toward the right.

The denominational stops 137, spaced by suitable means according to hole-spacing steps of the perforator-carriage, are pivoted upon a rod 143 mounted in the structure 138. The stops 137 have arms 144 which extend rearwardly and are notched at the ends for applying springs 146 anchored to a spring-plate 147 fastened to said structure. Said spring 146 on each stop 137 tends to rotate the stop and its arm 144 about the rod 143, so that the stop 137 tends to assume a position in which it may be intercepted by a counter-stop as the carriage moves. Four stop-selectors 149, underlying the lower edges of the arms 144 and extending transversely thereof, have formations 148, which, in the normal positions of said selectors, oppose said rotation. Said formations on each selector are so co-ordinated to the formations on the other selectors that, when a proper combination of the relative positions of the stop-selectors is effected, an opening is presented that will permit the arm 144 and consequently the stop 137 to rotate. To provide such an opening either one or two of the selectors are shifted from normal position. A group of four selectors affords ten different combinations of their relative positions by shifting one or two selectors, and in each of these combinations the formations on the selectors afford an opening for the rotation of a corresponding denominational stop.

In Figure 8 the denominational stops 137 are designated by numerals from 1 to 9, inclusive, and the four stop-selectors 149 are designated by the letters A, B, C and D. The following table shows what stop-selectors must be shifted to select the different denominational stops:

| For selecting denominational stop. | Shift selector-bars. |
|---|---|
| 1 | D |
| 2 | C & D |
| 3 | B & C |
| 4 | A & B |
| 5 | C |
| 6 | A & C |
| 7 | A |
| 8 | B |
| 9 | B & D |

The stop-selectors are held in normal positions by springs 149ª. Each selector, slidably mounted in the structure 138, is shiftable by means which include a slug 149ᵇ fastened to one end of a push-wire 150 connected at its other end to a plunger 151 of a solenoid 152 contained in the case 152ª. The push-wires 150 are encased in flexible sheaths 150ª. One or two of said solenoids are energized whenever one of the tabulating keys 48 is operated. To energize said solenoids, there is provided, under each key 48 and operable thereby, a contact device 157, which, when closed, completes a circuit to energize one or two of said solenoids. One of said contact devices is operated and the circuit remains closed throughout the stroke of the tabulating key.

The arms 144 bear upon the stop-selectors 149 through the tension of the springs 146, and means must be provided to hold said arms clear of the selectors while said selectors are being shifted by operation of a tabulating key. As already explained, the bell-crank 111 disengages the holding pallet 87 from the escapement-wheel 83 when a tabulating key is operated. Said bell-crank also operates the universal bar 98, which, by means of a link 159, is connected to a lever 153, which may raise a rod 154 supported by arms 155 fastened to the rod 143, about which the denominational stops 137 rotate. Said lever raises said rod 154 by engaging an extension 156 of one of the arms 155. The bell-crank 111 and consequently the universal bar 98 are held in operated position for the greater part of the tabulating key-stroke or until the contacts 119 open toward the end of said stroke. In this operated position, by means of said link 159, lever 153 and rod 154, the arms 144 are held clear of the stop-selectors while they are being shifted. Toward and at the end of the stroke of the tabulating key, the rod 154, when the contacts 119 open, reassumes its normal position by means of a spring 154ª, allowing the arm of the selected stop to fall into the opening afforded by the formations of the shifted stop-selectors. In the meantime a tabulating movement of the perforator-carriage has been initiated, and the selected stop 137, now moved into effective position, is intercepted by one of the counter-stops 133. This interception, followed by a continued movement of the perforator-carriage, causes a relative movement between the structure 138 and its supporting bracket 139, which, in effect, is a relative movement between said structure and the perforator-carriage. This relative movement causes a tappet 158 to strike and trip the latch 130. Said relative movement of the structure occurs against the tension of the spring 142. The tripping of the latch 130 permits the holding pallet 87 to re-engage the escapement-wheel and thereby end the tabulating movement. Said tappet 158 is pivoted at 158ª so that it may be swung upward if the latch is underneath it during a carriage-releasing movement of the lever 107.

The Underwood back-spacing mechanism includes a back-space key 160 on a lever 160ª connected to one end of a shaft 161. To the other end of said shaft is fastened an arm 162, to the end of which is pivoted a draw-link 163, which actuates the usual Underwood back-spacing members indicated at 164 and described in the patent to William F. Helmond, No. 930,962, dated August 10, 1909. Said draw-link 163 has the usual long spring-stud 165. Mounted at the side of the typewriter-frame 28 is a bracket 166 extending inwardly and having pivoted at the end thereof a bell-crank 167, which has a forked arm 167ª which engages the spring-stud 165. When the back-space key is operated and the draw-link 163 pulled downwardly thereby, said bell-crank rotates about its pivot, and the end 168 thereof, toward the end of the back-space key-stroke, closes contacts 169. Said end 168 is in the form of a roller or button made of insulating material. Said contacts 169 close a circuit to energize a solenoid 170, Fig. 7, to operate means for back-spacing the perforator-carriage. Said contacts 169 are mounted on the bracket 166 and suitably insulated therefrom.

Pivotally connected to the plunger 171 of said solenoid 170 is one end of a link 172. The other end of said link is pivotally connected to a bell-crank lever 173 pivoted upon a bracket 174 fastened to the perforator-frame. By means of a spring 175, said bell-crank 173 is held in normal position against a pin 176 driven into said bracket. Said bell-crank 173 when rotated by the solenoid 170 causes a toothed bar 177 to rotate about a longitudinal axis, so that teeth 178 on said bar engage a projecting member 179 on the perforator-carriage. Said toothed bar when thus engaged is then given a longitudinal movement to effect a back-spacing step of the perforator-carriage. The bar thus has a double movement,—first, to engage said projecting member, and then to move in a back-spacing direction. To accomplish said double movement, the bar is provided with trunnions 180 bearing in brackets 181 and 182 fastened to the perforator-frame. Said trunnions are also slidable longitudinally in said brackets so that the bar may move in a back-spacing direction. A shoulder 184 of the trunnions stops against the side of the bracket 182, and thereby limits the back-spacing movement of the bar. With proper formation of the teeth 178 and the endwise movement of the bar thus limited, overthrow of the perforator-carriage in back-spacing is substantially prevented. In order that the bell-crank 173 may swing the toothed bar 177 into engagement with the projecting member 179, one trunnion member of said bar is provided with a cam-block 183 engageable by the rounded edge 185 of an arm 186 of the bell-crank 173. Said edge 185, working against a suitably-inclined cam-surface of said block, causes the bar to rotate about its trunnions until one of the teeth 178 engages the projecting member 179, as shown in Figure 19. A further movement of the bell-crank, at the beginning of which the edge 185 has encountered a shoulder 187 of the cam-block, causes a back-spacing movement of the bar which is transmitted to the carriage and is completed, as shown in Figure 20. Figure 18 shows the toothed bar 177 in its normal position in which it is held by an obliquely-pulling spring 188, the pull of which has two components,—one being effective to swing the bar about its trunnions and disengage it from the projecting member, and the other component being effective to restore the bar after a back-spacing movement by sliding it along the trunnions 180. Figure 21 shows an alternative construction of a toothed back-spacing bar 190. An advantage of this form of bar is that the disengagement of the teeth from the projecting member is facilitated by a more direct recession of said teeth from said member when the bar is disengaged. The teeth in any form of bar are spaced according to the hole-spacing steps of the perforator-carriage.

Included in the main circuit supplying the solenoids, by means of which, the card-perforator and typewriter are coupled, is a contact device 191 normally closed and connected in said circuit by means of wires 192. Said contact device is supported by a bracket 193 fastened to a casing 194, which forms part of the computing mechanism. Bearing in said bracket is a plunger 195, which bears upon an insulated extension 196 of a resilient member 197 of the contact device. When said plunger is in depressed position, the contacts 198 are open and the main circuit thereby broken. When said circuit is broken, joint operation between the typewriter and the card-perforator is suspended. This suspension of joint operation is necessary while writing certain portions of a line of data on the work-sheet in the typewriter if said portions of the data are not to be transferred to the card. To automatically predetermine when such joint operation must be suspended, there are provided stops 199 movable with the typewriter-carriage and so spaced as to override and depress the plunger 195, and thereby cause the aforesaid main circuit to be open while said portions are being written. Said stops are set along a notched bar 200 similar to the bar in which the regular typewriter tabulating counter-stops are set. Said notched bar 200 may be supported between brackets 201 fastened to the upstanding sides 57 of the brackets 56. Said stops 199 have surfaces 202 of varying lengths corresponding to the extent of the zones in which joint operation is to be suspended. If joint operation is to be suspended for one step of the typewriter-carriage and resumed in the following step, one of said surfaces must be an edge 203, see Figure 4. Inclined camming edges 204 facilitate the depression of the plunger 195.

In the step in which the typewriter-carriage moves from a zone in which joint operation was suspended, the surface or edge passes from the plunger 195, permitting the contacts to close, so that the next stroke of a typewriter-key also operates the card-perforator mechanism. In said step the typewriter-carriage alone moves. If, at the end of said step, the typewriter-carriage is to be back-spaced by operating the back-space key 160, the contacts 198 must be opened before the stroke of the back-space key can close the contacts 169, or else the perforator-carriage will be back-spaced also. It is for this reason that the contacts 169 are closed only at the end of the back-spacing key-stroke, so that, when the typewriter-carriage is back-spaced into a zone of suspended joint operation, the contacts 198 are opened before the contacts 169 close. Said contacts 169 are ordinarily closed to energize the back-spacing solenoid 170. Said solenoid 170, supplied with current through the main circuit, cannot be energized when said main circuit is open. A full stroke of the back-space key causes a slight excess movement in the back-spacing step of the typewriter-carriage, and it is preferably during the portion of the stroke of the back-space key incidental to said excess movement that the contacts 169 are closed.

The well-known Underwood carriage-return mechanism as applied to the Underwood-Hanson bookkeeping machine is driven by the motor, not shown, of said bookkeeping machine. A belt 205 runs from said motor to a pulley 206 fastened to one end of a shaft 207, which has its bearing in a bracket 208 supported on the typewriter-frame 28. Keyed to said shaft is a clutch-member 209 engageable by another clutch-member 210 which is slidable on said shaft 207. Said other clutch-member has pinion teeth 211 which mesh with and drive a rack 212 fastened to the typwriter-carriage 25. The clutch-member 210 is slid into engagement with the clutch-member 209 by means of a lever 213 fastened to a shaft 214. The engagement of said clutch-members may be effected automatically as the carriage moves in the last letter-feeding step which terminates a line of writing. In said last step a link 215 is caused to be thrust downwardly by means shown in the patent to Richard F. Hoyt, No. 1,238,919, dated September 4, 1917. As said link is thrust downwardly, it depresses one end of a lever 216 mounted on a pivot 217 fastened in the typewriter-frame 28. The other end of said lever as it rises encounters a pin 218 fastened in the side of a link 219, and thereby raises said link 219, so that a notch 220 on said link escapes from its holding edge in a plate 221. The link 219 thus freed is pulled rearwardly by a spring 222, and, by means of an arm 223, rotates a shaft 224. Said shaft 224, by means of an arm 225 and a link 226, rotates the shaft 214 to effect engagement of the clutch-members. In this manner the clutch-members are automatically engaged after the carriage has taken its last letter-feeding step, and the carriage is then returned to its starting place.

At the end of the carriage-return movement, means, shown in said patent to Hoyt, rotate a shaft 227, and said rotation, by means of links 228 and 229, is transmitted to the shaft 214 to effect disengagement of the clutch-members.

A carriage-return movement may be also initiated by depressing a carriage-return key 230, which is mounted upon a lever 231 pivoted to the typewriter-frame 28 at 232. An arm 233 of said lever as it vibrates raises and frees the link 219 to actuate the train of parts described. Simultaneously with the engagement of the clutch-members 209 and 210, contacts within a case 234 are caused to be closed by the rearward movement of a bar 235 connected to the shaft 224.

Means whereby initiation of a carriage-return movement also causes a cycle of the perforating machine to be initiated are provided. Said perforating cycle is usually initiated by a perforator trip-key 238 at the typewriter keyboard, which, when operated, closes contacts 239, see Figure 9, to close a circuit to energize the usual solenoid 240. Said solenoid 240 when energized releases a clutch-member 241 (Figure 17) on the perforating machine. Said clutch-member 241 when released couples a main driving shaft 242 of the perforator to a driving disk 243 geared to a shaft 244 of a motor generator 245. Said main driving shaft has a commutator 246, which, toward the end of one revolution of said shaft, bridges contacts 247 to close a circuit to energize another solenoid 248 (not shown in Figure 9). Said solenoid 248 when energized trips a clutch-releasing member 248$^a$ to engage a clutch 249 by means of which the usual perforator carriage-return mechanism of the card-perforator is engaged to effect the return of the perforator-carriage 70.

An extension 250 (Figure 16) is added to the arm 223. When a typewriter carriage-return movement is initiated, said extension swings rearwardly, and its tip 251 sweeps over an arm 252 of a bell-crank 253, and thereby rotates said bell-crank, which is pivotally mounted on a plate 254 fastened to the typewriter-frame 28. The bell-crank 253 is held in normal position by a spring 255 which normally pulls in a line passing through the pivot center of the bell-crank, so that said spring is effective to return the bell-crank to its normal position, irrespective of the direction of rotation of the bell-crank. As the bell-crank is rotated by the rearward sweep of the extension 250, a roller 256 thereon, made of insulating material, closes for a moment the contacts 257. Said contacts 257, as already stated, bridge the contacts usually actuated by the regular perforator trip-key 238. A switch 259 may be provided and connected in a bridging circuit 260. When said switch is open the contacts 257 are ineffective to energize the solenoid 240, and consequently, when a typewriter carriage-return movement is initiated, said solenoid will not be energized when said switch is open.

All solenoids herein mentioned are preferably designed to operate on a low-voltage direct current, which may be supplied by the motor generator 245.

Figure 22 shows means whereby the main circuit may be opened and closed to automatically suspend and resume joint operation, said means being one way of enabling the use of uniform stops. There may be provided accordingly a bar 265 which would replace the bar 200, and, on said bar, uniform stops 266 may be set in positions corresponding to the beginning and end of a zone of suspended joint operation. A bracket 267 may be fastened to the casing 194 in place of the bracket 193. Said bracket 267 forms a bearing for a shaft 268, upon one end of which is formed a six-tooth pinion 269. Said stops 266 have tappet formations 270, whereby, as the typewriter-carriage moves, said pinion may be rotated. The number of teeth of said pinion 269 is limited preferably to six, so that, in one letter-feeding step of the typewriter-carriage, said tappet formations may engage and rotate said pinion one step and escape therefrom. A spring-pressed detent 271 lightly presses between adjacent teeth of the pinion and locates said pinion at each step. To the other end of the shaft 268 is fastened a commutator having segments 272 of conducting material, each of which may bridge through the brush-like contacts 273 and close a main circuit. Said segments are suitably insulated from one another and from the machine. The commutator should be made as light as possible to prevent overthrow due to inertia. Said contacts are connected in the main circuit by means of wires 274. It will be seen from Figure 22 that said main circuit may be alternately opened and closed by successive steps in the rotation of the pinion 269. Thus a stop 266 properly set will, in the step in which the carriage moves into a zone of suspended operation, rotate said pinion and cause the circuit through said contacts and one of said segments 272 to be opened as said segment 272 is rotated away from said contacts. In the step in which the carriage moves out of said zone of suspended joint operation, another stop, properly set, will rotate the pinion 269 through another step, bringing the succeeding segment under the contacts. The stops 266 are set apart a distance corresponding to the extent of the zone in which joint operation is to be suspended, a pair of stops being used to define the beginning and end of each zone.

The space-bar 42 of the typewriter, when operated, closes contacts 277 to energize a solenoid 278 (Figure 9). Said solenoid, by means of a push-wire 279 (Figure 3), actuates the universal bar 98 to effect a spacing step of the perforator-carriage 70.

Variations may be resorted to within the scope of the invention, and portions of the improvements may be used without others.

Having thus described my invention, I claim:

1. The combination with a typewriter having a letter-feeding carriage, a card-perforator having a hole-spacing carriage, a denominational tabulating mechanism on said typewriter controlled by a plurality of denominational keys, and electric coupling means whereby said typewriter and card-perforator may be jointly operated, and whereby the perforator-carriage is caused to move in unison with the typewriter-carriage during the type-key operations, of means whereby operation of said denominational keys to position the typewriter-carriage may also cause said perforator-carriage to be co-relatively but dissentaneously positioned.

2. In a combined typewriting and card-perforating machine, the combination with a typewriting-carriage movable in letter-feeding steps, a perforator-carriage movable in hole-spacing steps, an escapement mechanism for each carriage for controlling said steps, and a denominational tabulating mechanism controlled by denominational keys for tabulating said typewriter-carriage, of means operable by said keys whereby said perforator-carriage may be denominationally tabulated corelatively but dissentaneously with said typewriter-carriage.

3. In a combined typewriting and card-perforating machine, the combination with a typewriter-carriage movable in letter-feeding steps, a perforator-carriage movable in hole-spacing steps, an escapement mechanism for each carriage, and a denominational tabulating mechanism controlled by denominational keys for tabulating said typewriter-carriage, of means electrically controlled by said keys whereby operation of said keys may also cause said perforator-carriage to be denominationally tabulated corelatively but dissentaneously with said typewriter-carriage.

4. The combination with a card-perforating machine having a carriage movable in hole-spacing steps, of a plurality of denominational tabulating stops, each individually movable into effective position, devices capable of cooperating with any moved stop to limit a tabulating movement of said carriage, and key-controlled means to initiate a tabulating movement and selectively move any one of said stops to position to cause the arrest of said carriage at the denomination determined by the operated key.

5. In a card-perforating machine having punch-controlling keys and a carriage movable in hole-spacing steps, the combination with a carriage-motor, carriage-escapement mechanism controlled by said keys, and one or more settable counter-stops stationary relatively to said carriage when set, of a plurality of denominational stops, each individually movable into and out of cooperative relation to said counter-stops, a plurality of tabulating keys, one for each denominational stop, means whereby operation of any tabulating key causes the release of said carriage from the control of its escapement mechanism for an ensuing tabulating movement, and also causes a corresponding denominational stop to move into position for interception by one of said counter-stops, and means whereby said interception causes the termination of said release and thereby determines the end of said tabulating movement.

6. In a card-perforating machine having punch-controlling keys and a carriage movable in hole-spacing steps, the combination with a carriage-motor, carriage-escapement mechanism controlled by said keys, and one or more settable counter-stops stationary relatively to said carriage when set, of a plurality of denominational stops, each individually movable into and out of co-operative relation to said counter-stops, a plurality of tabulating keys, one for each denominational stop, means whereby operation of any tabulating key causes the release of said carriage from the control of its escapement mechanism for an ensuing tabulating movement, latching means for sustaining said release, means whereby operation of any tabulating key also causes a corresponding denominational stop to be brought into position for interception by one of said counter-stops, and means whereby said interception causes said latching means to be tripped thereby terminating said release and tabulating movement.

7. In a denominational tabulating mechanism for a card-perforator carriage or the like, the combination of a plurality of tabulating keys, a plurality of denominational stops, one for each key, each stop normally out of effective position, but selectively movable into said position, means operated by said keys to effect the selective movement of said stops, a plurality of shiftable stop-selectors, means whereby operation of any tabulating key shifts the relative positions of said selectors to effect a corresponding arrangement of said positions, said selectors having co-ordinated formations that, in each of said arrangements, permit only the stop corresponding to the operated tabulating key to move and to be thereby selected, and means co-operating with the selected stop to check a tabulating movement of the carriage, said movement being initiated by depression of any key.

8. In a denominational tabulating mechanism for a card-perforator carriage or the like, the combination of a plurality of tabulating keys, a plurality of denominational stops, one for each key, each normally out of effective position, but selectively movable into said position, means operated by said keys to effect the selective movement of said stops, a plurality of shiftable stop-selectors, means whereby operation of any tabulating key shifts the relative positions of said selectors to effect a corresponding arrangement of said positions, said selectors having co-ordinated formations that, in each of said arrangements, permit only the stop corresponding to the operated tabulating key to move and to be thereby selected, means whereby operation of any key causes a tabulating movement of said carriage, and means co-operating with the selected stop to determine and limit the extent of said tabulating movement.

9. In a denominational tabulating mechanism for a card-perforator carriage or the like, the combination of a plurality of tabulating keys, a plurality of spring-pressed, selectively movable, denominational stops, one for each key, a plurality of stop-selectors normally opposing a selective movement of said stops, means whereby operation of any key shifts the relative positions of said selectors to cause the selection of a corresponding denominational stop, means operable during the stroke of a tabulating key, whereby said denominational stops are held clear of said stop selectors while said selectors are being shifted, said last-mentioned means reassuming their normal position so that the selected stop may move into effective position, means whereby operation of any key initiates a tabulating movement of the perforator-carriage, and means whereby the selected denominational stop limits and terminates said movement.

10. In a denominational tabulating mechanism for a card-perforator carriage or the like, the combination of a plurality of tabulating keys, a plurality of spring-pressed, selectively movable, denominational stops, one for each key, a universal member for controlling the selective movement of said stops, a plurality of shiftable stop-selectors, means whereby operation of any tabulating key shifts the relative positions of said selectors to effect a corresponding arrangement of said positions, said selectors having co-ordinated formations that, in each of said arrangements, permit only the stop corresponding to the operated tabulating key to move and to be thereby selected, means whereby operation of any tabulating key also causes an oscillation of said universal member to hold said stops clear of said selectors while said selectors are being shifted, means whereby operation of any key also causes a tabulating movement of said carriage, and means co-operating with the selected stop to determine and limit the extent of said tabulating movement.

11. In a denominational tabulating mechanism for a card-perforator carriage or the like, the combination of a plurality of tabulating keys, a plurality of selectively movable denominational stops, one for each key, means operated by said keys to effect a selective movement of said stops, a plurality of shiftable stop-selectors, said selectors being disposed so that formations thereon normally oppose a movement of said stops, means, including an electromagnet, for each selector for shifting said selector, circuit-closing devices operable by said tabulating keys whereby operation of any key will energize one or more electromagnets to shift one or more of said selectors and thereby cause a stop corresponding to the operated key to be selected, means whereby operation of any key causes a tabulating movement of said carriage, and means co-operating with the selected stop to determine and limit the extent of said movement.

12. In a denominational tabulating mechanism for a card-perforator carriage or the like, the combination of a plurality of tabulating keys, a plurality of selectively movable denominational stops, one for each key, means operated by said keys to effect a selective movement of said stops, a plurality of shiftable stop-selectors, said selectors being disposed so that formations thereon normally oppose a movement of said stops, means whereby operation of any key shifts the relative positions of said selectors to effect a corresponding arrangement of said positions, wherein the stop corresponding to the operated key is free to move and is thereby selected, the plurality of said selectors being sufficient to afford a sufficient plurality of different arrangement combinations, one combination for each stop, said combinations being based on a predetermined maximum of the number of selectors to be shifted by one key, means whereby operation of any key causes a tabulating movement of said carriage, and means co-operating with the selected stop to determine and limit the extent of said tabulating movement.

13. In a denominational tabulating mechanism for a card-perforator carriage or the like, the combination of a plurality, not exceeding ten, of denominational stops, each selectively movable into effective position, a plurality of tabulating keys, one for each stop, means operated by said keys to effect a selective movement of said stops, a plurality, not exceeding four, of shiftable stop-selectors, said selectors being disposed so that formations thereon normally oppose a movement of said stops, means whereby operation of any key shifts one or two selectors, thereby effecting an arrangement of said selectors wherein the stop corresponding to the operated key is free to move and is thereby selected, means whereby operation of any key causes a tabulating movement of said carriage, and means co-operating with the selected stop to determine and limit the extent of said tabulating movement.

14. In a denominational tabulating mechanism for a card-perforator carriage or the like, the combination of a plurality, not exceeding ten, of denominational stops, selectively movable into effective position, a plurality of tabulating keys, one for each stop, means operated by said keys for effecting a selective movement of said stops, a plurality, not exceeding four, of shiftable stop-selectors, said selectors being disposed so that formations thereon normally oppose a movement of said stops, means including an electromagnet for each selector for shifting said selectors, a plurality of circuit-closing devices operable by said tabulating keys, whereby operation of any key will energize one or two electromagnets to shift one or two of said selectors and thereby permit a stop corresponding to the operated key to be moved and thereby selected, means whereby operation of any key causes a tabulating movement of said carriage, and means whereby the selected stop determines and limits the extent of said movement.

15. In a card-perforating or similar machine having a carriage movable step by step, the combination of a structure movable relatively to said carriage and mounted thereon, a plurality of selectively movable denominational tabulating stops supported in said structure, one or more settable counter-stops stationary relatively to said carriage when set, said counter-stops being disposed to intercept a selected denominational stop, a carriage-motor, an escapement mechanism for controlling the movement of said carriage, a plurality of denominational keys, one for each denominational stop, means operable by any one of said keys whereby said carriage is released from the control of said escapement mechanism for an ensuing tabulating movement imparted by said motor, means whereby operation of any key also causes a corresponding denominational stop to be selected and moved for interception by one of said counter-stops, said interception causing a relative movement between said structure and said carriage, and means whereby said relative movement causes said release to be terminated and said tabulating movement to be thereby checked.

16. In a card-perforating or similar machine having a carriage movable step by step, the combination of a structure movable relatively to said carriage and mounted thereon, a plurality of selectively movable denominational tabulating stops supported in said structure, one or more settable counter-stops stationary relatively to said carriage when set, said counter-stops being disposed to intercept a selected denominational stop, a carriage-motor, an escapement mechanism for controlling the movement of said carriage, means whereby the carriage is released from the control of said escapement mechanism for an ensuing motor-impelled tabulating movement and whereby also a denominational stop is selected and moved for interception by one of said counter-stops, said interception causing a relative movement between said structure and said carriage, and means whereby said relative movement causes said release to be terminated and said tabulating movement to be thereby checked.

17. In a card-perforating or similar machine having a carriage movable step by step, the combination of a structure movable relatively to said carriage and mounted thereon, a plurality of selectively movable denominational tabulating stops supported in said structure, a carriage-motor, a carriage-escapement mechanism, one or more settable counter-stops stationary relatively to said carriage when set, said counter-stops being disposed to intercept a selected denominational stop, means including a lever on said carriage whereby the carriage is released from the control of said escapement mechanism for an ensuing motor-impelled tabulating movement, means including a latch on said lever whereby said release is sustained, a latch-tripping tappet on said structure, said tappet being divertible by the latch in a carriage-releasing movement of said lever, and means also operated by said carriage-releasing means whereby a denominational stop is selected and moved for interception by one of said counter-stops, said interception causing a relative movement between said structure and said carriage, said movement causing said tappet to move against and trip said latch whereby said release is terminated and the tabulating movement of the carriage is checked.

18. The combination with a typewriter having a letter-feeding carriage and also having a back-spacing mechanism for said carriage, a card-perforator having a hole-spacing carriage, each carriage movable under the control of its own escapement mechanism, and electrically-controlled coupling means whereby said typewriter and said card-perforator may be jointly operated, and whereby also said carriages may be correspondingly tabulated in zones of dissentaneous extents and locations, of means whereby operation of said back-spacing mechanism to back-space the typewriter-carriage may cause the card-perforator carriage to be also back-spaced, at different relative positions of said carriages.

19. The combination with a typewriter having a letter-feeding carriage and also having a back-spacing mechanism for said carriage, a card-perforator having a hole-spacing carriage, each carriage movable under the control of its own escapement mechanism, and electrically-controlled coupling means whereby said typewriter and said card-perforator may be jointly operated, of a member having an array of teeth parallel to the path described by some point moving in unison with said perforator-carriage, a device engageable by said teeth and situated on the perforator-carriage at said point, said device and said teeth being normally out of engagement, means for mounting said member so that said member is capable of a double movement by which it first engages said device and then moves in a direction effective to cause a back-spacing movement of said perforator-carriage, and means whereby said double movement is imparted to said member by operation of said back-spacing mechanism to back-space said typewriter-carriage, thereby causing said card-perforator carriage to be also back-spaced.

20. The combination with a typewriter having a letter-feeding carriage and also having a back-spacing mechanism for said carriage, a card-perforator having a hole-spacing carriage, each carriage movable under the control of its own escapement mechanism through corresponding zones of dissentaneous extents and locations, and electrically-controlled coupling means whereby the typewriter and card-perforator may be jointly operated, of electrically-controlled mechanical means whereby operation of said back-spacing mechanism when back-spacing the typewriter-carriage may cause the card-perforator carriage to be also back-spaced at different relative positions of said carriages.

21. The combination with a typewriter having a letter-feeding carriage and also having a back-spacing mechanism for said carriage, a card-perforator having a hole-spacing carriage, each carriage movable under the control of its own escapement mechanism, and electrically-controlled coupling means for joint operation of the typewriter and card-perforator, of means whereby said joint operation is suspended while said typewriter-carriage is in predetermined zones, thereby causing said perforator-carriage to be stationary while the typewriter-carriage moves through said zones, and means controlled by said last-mentioned means whereby operation of the back-spacing mechanism to back-space the typewriter-carriage will cause the card-perforator carriage to be also back-spaced if and only if the last previous letter-feeding step of the typewriter-carriage was accompanied by a hole-feeding step of the perforator-carriage.

22. The combination with a typewriter having a letter-feeding carriage, a card-perforator, and electrically-controlled coupling means for joint operation of said typewriter and card-perforator, of means whereby said coupling means are automatically caused to be ineffective and said joint operation thereby suspended while said typewriter-carriage moves through predetermined zones, said last-mentioned means including settable devices on the typewriter-carriage whereby the extent and limits of said zones are relatively defined.

23. The combination with a typewriter having a letter-feeding carriage, a card-perforator, and electrically-controlled coupling means, including a main electrical circuit, for joint operation of said typewriter and card-perforator, of means, including separable contacts for opening said circuit and also including settable devices on the typewriter-carriage for controlling said contacts, whereby said coupling means are automatically caused to be ineffective and said joint operation thereby suspended while the typewriter-carriage moves through predetermined zones, said settable devices being for the purpose of relatively defining the extent and limits of said zones.

24. The combination with a typewriter having a letter-feeding carriage, a card-perforator, and electrically-controlled coupling means including a main electrical circuit for joint operation of said typewriter and card-perforator, of separable contacts for opening said circuit, and devices settable on said carriage for controlling said contacts, said devices having formations for separating said contacts and maintaining said separation while the carriage moves through predetermined zones, said formations being substantially co-extensive with said zones.

25. The combination with a typewriter having a letter-feeding carriage and also having a back-spacing mechanism, a card-perforator having a hole-spacing carriage, each carriage movable under the control of its own escapement mechanism, and electrically-controlled coupling means including a main circuit normally closed for effecting joint operation of said typewriter and card-perforator during which both carriages move in unison, of a perforator-carriage back-spacing mechanism, means including electrical devices for operating said perforator-carriage back-spacing mechanism, said devices being in a normally open branch-circuit derived from said main circuit, means controlled by said typewriter-carriage whereby said main circuit is caused to be open while said carriage is in predetermined zones, thereby causing said joint operation to be suspended in said zones, said last-mentioned means operating to open said main circuit during an advance or backward step in which the typewriter-carriage moves into one of said zones and also operating to close said main circuit during an advance or backward step in which the typewriter moves out of one of said zones, and means whereby, in the operation of said typewriter-carriage back-spacing mechanism, said branch-circuit is closed when the typewriter-carriage has completed its back-spacing step, thereby assuring that the typewriter-carriage alone is back-spaced if said back-spacing is a step into a zone of suspended joint operation, the devices in said branch-circuit being ineffective if the main circuit is open.

26. In a typewriting machine coupled to a card-perforating machine for joint operation, said typewriting machine having a carriage movable to advance in letter-feeding steps, the combination with means for initiating a machine cycle of said card-perforating machine, and means for initiating a power-driven return movement of the typewriter-carriage, of means whereby operation of said means for initiating a return movement of the typewriter-carriage automatically actuates said means for initiating a machine cycle of said card-perforating machine.

27. In a typewriting machine coupled to a card-perforating machine for joint operation, said typewriting machine having a carriage movable to advance in letter-feeding steps, the combination with means for initiating a machine cycle of said card-perforating machine, and means for initiating a power-driven return movement of the typewriter-carriage, of means whereby operation of said means for initiating a return movement of the typewriter-carriage automatically actuates said means for initiating a machine cycle of said card-perforating machine, and means for rendering said automatic cycle-initiating means inoperative.

28. In a typewriting machine coupled to a card-perforating machine for joint operation, said typewriting machine having a carriage movable to advance in letter-feeding steps, the combination with means for initiating a machine cycle of said card-perforating machine, and means for initiating a power-driven return movement of the typewriter-carriage, of means whereby operation of said means for initiating a return movement of the typewriter-carriage automatically actuates said means for initiating a machine cycle of said card-perforating machine, and manually controllable means for rendering said automatic cycle-initiating means inoperative by the means for initiating a return movement of the typewriter-carriage.

29. In a typewriting machine coupled to a card-perforating machine for joint operation, said typewriting machine having a carriage movable to advance in letter-feeding steps, the combination with means for initiating a return movement of the typewriter-carriage, and an electromagnet capable, when energized, of actuating means to initiate a machine cycle of said card-perforating machine, of means whereby operation of said means for initiating a return movement of the typewriter-carriage automatically causes said electromagnet to be energized to initiate a machine cycle of said card-perforating machine.

30. In a typewriting machine coupled to a card-perforating machine for joint operation, said typewriting machine having a carriage movable to advance in letter-feeding steps, the combination with means for initiating a return movement of the typewriter-carriage, and an electromagnet capable, when energized, of actuating means to initiate a machine cycle of said card-perforating machine, of a circuit-closing device for closing a circuit to energize said electromagnet, and means whereby operation of said means for initiating a return movement of the typewriter-carriage automatically operates said circuit-closing device to close said circuit, and thereby energize said electromagnet to initiate a machine cycle of said card-perforating machine.

31. In a typewriting machine coupled to a card-perforating machine for joint operation, said typewriting machine having a carriage movable to advance in letter-feeding steps, the combination with means for initiating a return movement of the typewriter-carriage, and an electromagnet capable, when energized, of actuating means to initiate a machine cycle of said card-perforating machine, of a circuit-closing device for closing a circuit to energize said electromagnet, means whereby operation of said means for initiating a return movement of the typewriter-carriage automatically operates said circuit-closing device to close said circuit, and thereby energize said magnet to initiate a machine cycle of said card-perforating machine, and a circuit-opening device normally closed and connected in said circuit whereby said circuit may be opened and said electromagnet made inoperative from and with respect to said circuit.

32. In a typewriting machine coupled to a card-perforating machine for joint operation, said typewriting machine having a carriage movable to advance in letter-feeding steps, the combination with means for initiating a power-driven return movement of the typewriter-carriage, an electromagnet capable, when energized, of actuating means to initiate a machine cycle of said card-perforating machine, and a key-controlled circuit-closing device for closing a circuit to energize said electromagnet, of another circuit-closing device for closing another circuit to energize said electromagnet, and means whereby operation of said means for initiating a return movement of the typewriter-carriage automatically operates said other circuit-closing device to close said other circuit, and thereby energize said electromagnet to initiate a machine cycle of said card-perforating machine.

33. In a typewriting machine coupled to a card-perforating machine for joint operation, said typewriting machine having a carriage movable to advance in letter-feeding steps, the combination with means for initiating a power-driven return movement of the typewriter-carriage, and an electromagnet capable, when energized, of actuating means to initiate a machine cycle of said card-perforating machine, of a circuit-closing device for closing a circuit to energize said electromagnet, and means whereby operation of said means for initiating a return movement of the typewriter-carriage automatically operates said circuit-closing device to close for a moment said circuit, and thereby energize said electromagnet for a moment sufficient to initiate a machine cycle of said card-perforating machine.

34. The combination with a typewriting machine having a letter-feeding carriage, a card-perforator, and coupling means whereby said typewriting machine and said card-perforator are jointly operated, of two or more uniform stops settable on said carriage, and means actuable by one of said stops to render said coupling means ineffective and thereby cause suspension of the joint operation as said carriage moves into a predetermined zone, and actuable by another stop to cause resumption of said joint operation as said carriage moves out of said zone, said stops being set apart a distance corresponding to the extent of said zone.

35. The combination with a typewriting machine having a letter-feeding carriage, a card-perforator and coupling means whereby said typewriting machine and said card-perforator are jointly operated, of two or more uniform stops settable on said carriage, and means actuable by said stops whereby said coupling means are alternately rendered effective and ineffective as said carriage moves into and out of a predetermined zone, said stops being set apart a distance corresponding to the extent of said zone.

36. The combination with a typewriting machine having a letter-feeding carriage, a card-perforator, and electrical devices supplied with current through a main circuit, whereby said typewriting machine and said card-perforator are jointly operated, of two or more uniform stops settable on said carriage, and means actuable by said stops whereby said main circuit may be alternately broken and made as said carriage moves into and out of a predetermined zone, said stops being set apart a distance corresponding to the extent of said zone.

37. The combination with a typewriting machine having a letter-feeding carriage, a card-perforator, and electrical devices supplied with current through a main circuit whereby said typewriting machine and said card-perforator are jointly operated, of two or more uniform tappets settable on said carriage, a pinion operable by said tappets as said carriage moves, said pinion having a limited number of teeth so that in one letter-feeding step of said carriage a tappet may engage, rotate said pinion one step and escape, and means connected to said pinion whereby successive steps of said pinion when operated by said tappets alternately break and make said main circuit to cause suspension and resumption of the joint operation as said carriage moves into and out of predetermined zones, said tappets being set apart a distance corresponding to the extent of said zones.

38. The combination with a typewriting machine having a letter-feeding carriage, a card-perforator, and electrical devices supplied with current through a main circuit whereby said typewriting machine and said card-perforator are jointly operated, of two or more uniform tappets settable on said carriage, a pinion operable by said tappets as said carriage moves, said pinion having a limited number of teeth so that in one letter-feeding step of said carriage a tappet may engage, rotate said pinion one step and escape, a circuit opening and closing device, and a device operatively connected to said pinion and whereby successive steps of said pinion, when operated by said tappet, cause said circuit opening and closing device to alternately open and close said main circuit to cause suspension and resumption of the joint operation as said carriage moves into and out of predetermined zones, said tappets being set apart a distance corresponding to the extent of said zones.

39. A letter-feeding typewriter-carriage, a punching mechanism including a step-by-step feeding carriage, a denominational tabulating mechanism for the typewriter-carriage, another denominational tabulating mechanism for the punching-machine carriage, a single set of denominational tabulating keys controlling both of said tabulating mechanisms, and connections effective in the tabulating operation to cause the typewriter-carriage to have traveled farther than the punching-machine carriage when both carriages rest at the same denomination.

40. A letter-feeding typewriter-carriage, a punching mechanism including a step-by-step feeding carriage, a denominational tabulating mechanism for the typewriter-carriage, another denominational tabulating mechanism for the punching-machine carriage, a single set of denominational tabulating keys controlling both of said tabulating mechanisms, and connections effective in the tabulating operation to cause the typewriter-carriage to have traveled farther than the punching-machine carriage when both carriages rest at the same denomination, thereby to provide for different ranges of ascending denominations, said ranges defining the extents of corresponding zones in which said carriages are tabulated.

41. The combination with a typewriter having a letter-feeding carriage and also having a back-spacing mechanism for said carriage, a card-perforator having a hole-spacing carriage, each carriage movable under the control of its own escapement mechanism, and electrically-controlled coupling means whereby said typewriter and said card-perforator may be jointly operated and whereby also said carriages may be correspondingly tabulated in zones of dissentaneous extents and locations, of means whereby operation of said back-spacing mechanism to back-space the typewriter-carriage may cause the card-perforator carriage to be also back-spaced, whether or not the perforator-carriage is back-spaced depending on the relative positions of the carriages.

JESSE A. B. SMITH.